United States Patent [19]

Connor et al.

[11] Patent Number: 4,579,485
[45] Date of Patent: Apr. 1, 1986

[54] MULTI-PURPOSE DRILL GUIDE

[76] Inventors: Frederick S. Connor, 30 Kimberly La., West Warwick, R.I. 02893; James A. Connor, Wills Swamp Rd., West Greenwich, R.I. 02816

[21] Appl. No.: 639,578

[22] Filed: Aug. 10, 1984

[51] Int. Cl.⁴ .............................................. B23B 49/02
[52] U.S. Cl. ................................ 408/115 R; 408/92 R
[58] Field of Search ............... 408/72 R, 72 B, 115 R, 408/115 B, 103, 241 B, 241 R, 241 G, 110; 33/185, 189

[56] References Cited

U.S. PATENT DOCUMENTS

| 2,211,634 | 8/1940 | Baker | 408/115 R |
| 2,466,023 | 4/1949 | Griffin | 408/115 R X |
| 2,838,966 | 6/1958 | Campbell | 408/115 R |
| 2,949,798 | 8/1960 | Berta, Jr. | 408/115 R |
| 4,176,989 | 12/1979 | Wolff | 408/115 R |
| 4,257,166 | 3/1981 | Barker et al. | 408/115 R |
| 4,294,567 | 10/1981 | Wiggins | 408/115 R X |
| 4,474,514 | 10/1984 | Jensen | 408/72 R |

FOREIGN PATENT DOCUMENTS

| 2750869 | 5/1979 | Fed. Rep. of Germany ... 408/241 B |
| 3039673 | 5/1982 | Fed. Rep. of Germany ... 408/115 R |
| 1401716 | 7/1975 | United Kingdom ........... 408/115 R |
| 2071537 | 9/1981 | United Kingdom ........... 408/241 G |

Primary Examiner—Gil Weidenfeld
Assistant Examiner—Glenn L. Webb
Attorney, Agent, or Firm—Robert J. Doherty

[57] ABSTRACT

A cabinetry drill guide which can be alternatively used to measure holes for hardware pulls in drawers and in doors. The guide includes a generally rectangular body which is placed against the cabinet surface, a pair of separated first pins extending from the body and which align the body parallel to the cabinet drawer or door edge which they contact and a single second pin. The second pin is disposed along a line at right angles to the line formed by the first pins so as to define a right angle relationship and thus square the body vis-a-vis a door. The second pin can be moved to an inactive position flush with the body when the guide is used with cabinet drawers.

4 Claims, 7 Drawing Figures

MULTI-PURPOSE DRILL GUIDE

BACKGROUNG AND OBJECTS OF THE INVENTION

The present invention relates to a drilling fixture and more particularly to a fixture for drilling holes for the installation of both door pulls and drawer pulls on kitchen and other types of cabinets. A recurring problem with installing kitchen cabinet hardware is that it is difficult to accurately mark off the location for the door and drawer pulls as by measuring in from the sides and down from the top of the drawer or door. Although errors by experienced carpenters in so locating hardward pull holes is not common, it does occur and would, accordingly, be desirable to avoid. This problem is even more significant when installation of cabinetry is performed by inexperienced people. It would, accordingly, be desirable to eliminate this source of error and waste.

In addition to the chance of inaccurately drilling cabinet pull hardward openings in drawers and doors as above explained, such task necessitates careful and time consuming effort. Accordingly, it would be desirable to be able to speed up such installation without sacrificing accuracy.

Although drilling fixtures for mounting cabinet door pulls are known such as those described in U.S. Pat. No. 2,949,798 issued Aug. 23, 1960 and U.S. Pat. No. 2,990,733 issued July 4, 1961, there remains a need for a device which cannot only accurately locate and serve as a guide for drilling holes in doors but which can similarly be utilized with equal ease in locating and drilling holes for drawers. Other patents of which the present inventors are aware are U.S. Pat. No. 2,798,520 issued Jan. 6, 1957 and U.S. Pat. No. 3,804,546 issued Apr. 16, 1974 which relate to a single purpose drill guide and a multi-purpose drill guide respectively. Despite the existence of these patents, there remains a need for a simple, easy to use, relatively inexpensive multi-purpose drill guide which can be used to locate and assist in drilling holes in both drawer and door cabinetry.

These and other objects of the invention are accomplished by a drilling fixture for alternate use in drilling holes for the mounting screws for both cabinet drawer and door pulls comprising a body plate having planar front and rear surfaces adapted in turn to contact the outer cabinet surfaces of said drawers and doors, said plate further having first and second outer edge surfaces disposed in adjacent generally L-shaped configuration to each other, said plate having a pair of fixed longitudinally spaced first guide pegs outwardly extending from both said front and rear surfaces thereof proximally along said first outer edge such that engagement of said first pegs with an adjacent edge of said outer cabinet surfaces squares said first edge surface therewith, said plate further having a second guide peg having opposite front and rear ends normally outwardly extending from both said front and rear surfaces thereof inwardly offset but proximal to said second outer edge, said second peg adjustable forwardly and rearwardly such that either end thereof can be disposed in a depressed alternate position essentially flush with regard to the planar plate proximal thereto and a plurality of drill guide holes extending though said plate.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 4:
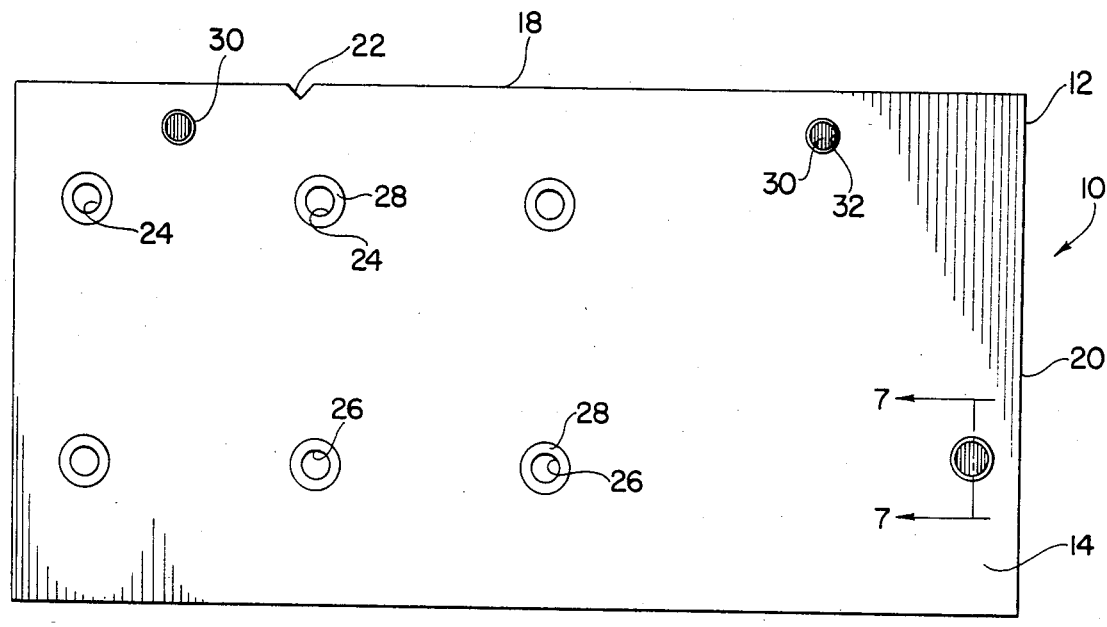
FIG. 4 is a front elevational view similar to FIG. 1 but of a simplified version of the device.

Turning now to the drawings and particularly FIG. 4 thereof, the device 10 of the present invention is shown in its simplest form. Therein the device includes a body or plate 12 preferably of rectangular configuration and having a front planar surface 14 and a rear planar surface 16. The top edge surface comprises a first edge surface 18 and the right side edge surface comprises a second outer edge surface 20. The first edge surface 18 is provided with a notch 22 of V-shaped configuration for a purpose that will hereinafter be more fully explained and preferably aligned with the center opening of two horizontally oriented rows of openings 24 and 26 which are vertically separated from each other and which extend through the body 12. Such openings may be provided with drill bushings 28 which reduce wear when the openings are utilized as a guide for drills. The top row of openings 24 is designated for doors and the bottom row of openings for drawers, however, flexibility in this regard as well as the number, positioning, and dimensional location of such holes can be varied depending on the results desired with respect to positioning of finished cabinet pulls for such doors or drawers.

In addition, a pair of fixed longitudinally spaced first guide pegs are provided preferably vertically downwardly disposed but proximal the first outer edge 18 and aligned in parallel regard thereto. The pegs 30 are of cylindrical configuration preferably and are received in cylindrical openings 32 passing through the body 12. Alternatively, the pegs could be welded or otherwise affixed directly to the top surface 18 although it is preferable to be located and fixed to the body as shown.

Figure 5:
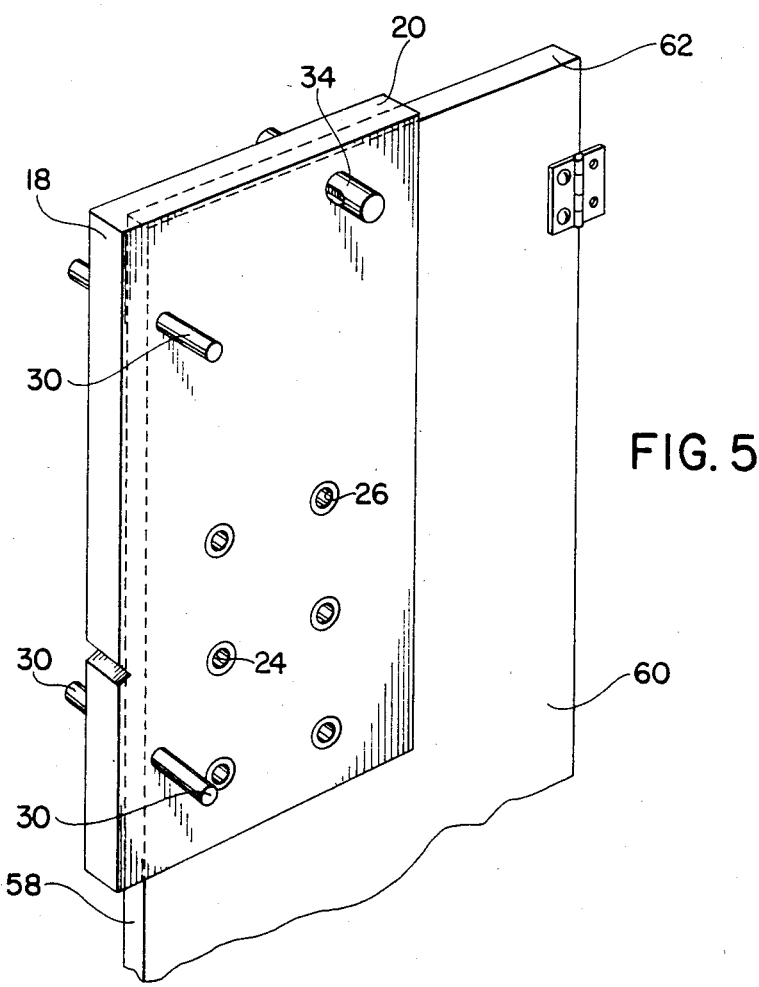
FIG. 5 is a elevational view of the simplified device of FIG. 4 showing the manner in which it may be utilized to form a door pull opening for cabinetry.
Figure 6:
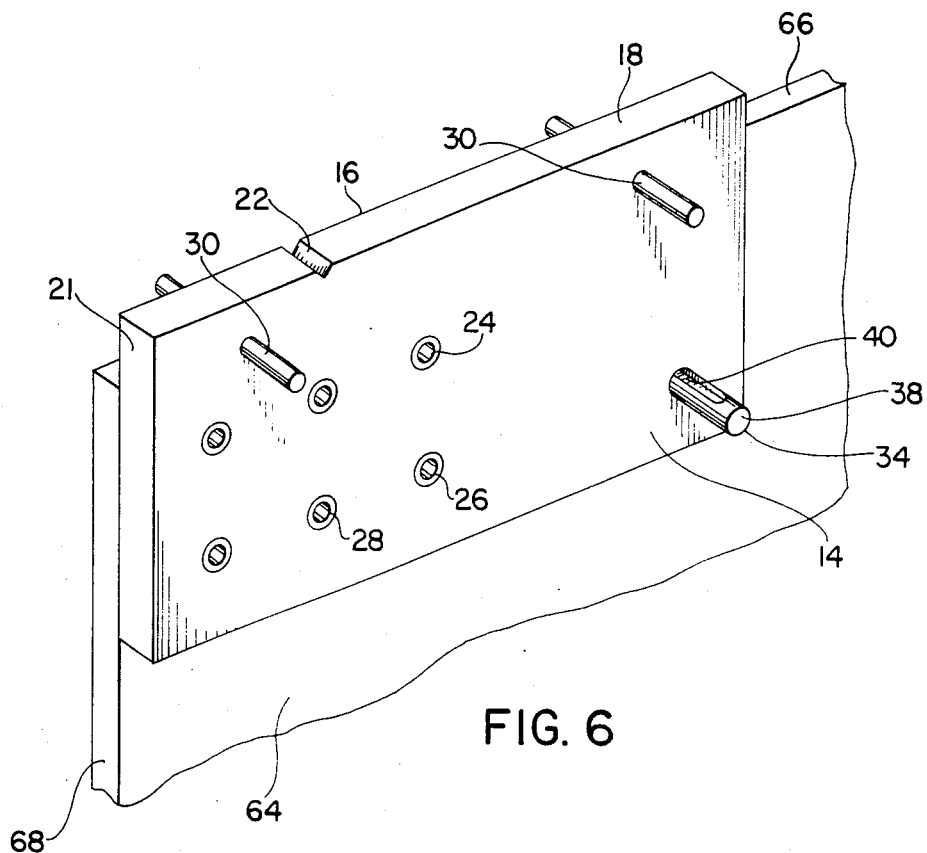
FIG. 6 is a view similar to FIG. 5 but showing how the simplified device of FIG. 4 may be utilized to locate drawer pull openings.
Figure 7:
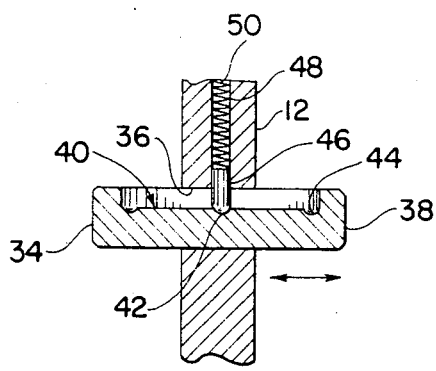
FIG. 7 is a partial sectional view taken along the lines 7—7 in both FIGS. 1 and 4.

A second guide peg 34 of cylindrical construction is received within a bore 36 passing through the body 12 at a location proximal to the second outer edge surface 20. While the position of the first guide pegs 30 is fixed with respect to the body 12, that is, that they extend from opposite front and rear surfaces 14, 16 respectively thereof, the positioning of the second peg 34 is such that it may be moved to alternate positions such that either end 38 thereof may be positioned substantially flush, that is, even with, the front or the rear surface. This is accomplished by providing a stop means in the body 12 such that the second peg 34 can be moved in the directly of the arrows. Such stop means as best shown in FIG. 7 is in the form of a recess 40 open to the side of the peg 34 and upwardly outwardly extending. The floor of the recess 40 is provided with a central depression 42 and preferably outer depressions 44 such that a detent 46 extending downwardly from a bore 48 provided in the body 12 and spring urged by spring 50 will contact such depressions such that a slight holding pressure is brought to bear upon the peg 34 in any of the three positions brought about by such detent recess contact. In other words, either of the ends 38 thereof, for instance, the right hand end 38 could be moved to the left such that the end was substantially flush with the planar surface of the body 12 proximal thereto. In such condition, the detent 46 would contact the right recess 44. Similarly, the peg 34 could be moved to the right so that the left end was substantially flush with the opposite planar surface of the body 12. The normal positioning of the peg 34 is, however, central, and it is in that position that it is utilized as a drill guide for cabinet doors as best shown in FIG. 5 of the drawings.

Figure 1:
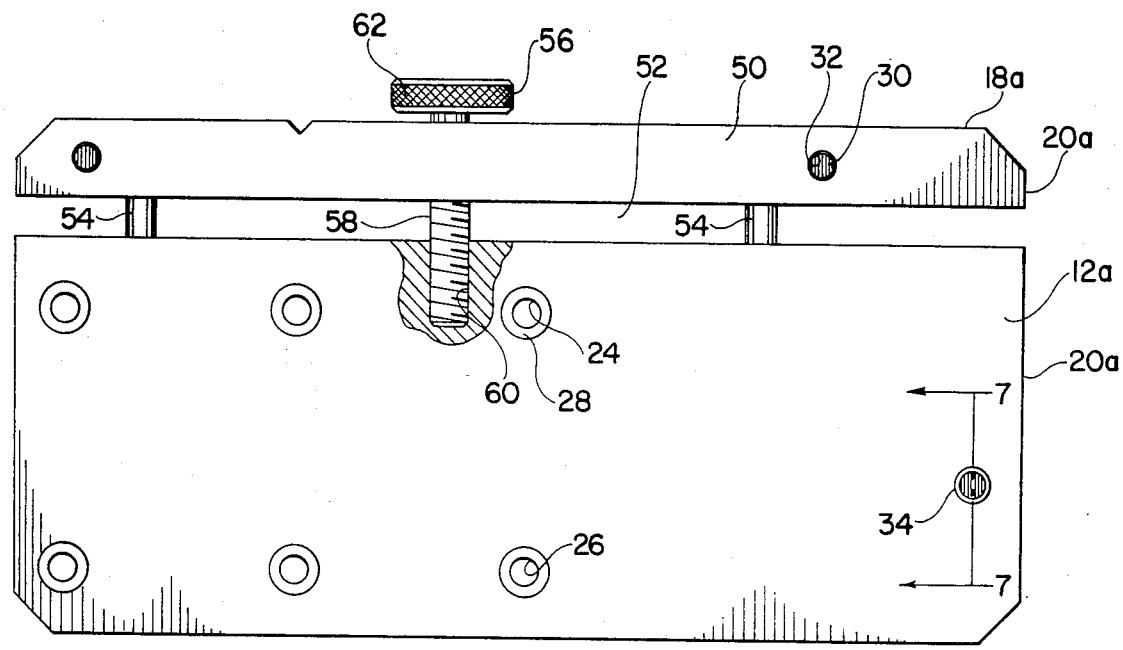
FIG. 1 is front elevational view of a preferred form of the device of the present invention.
Figure 2:
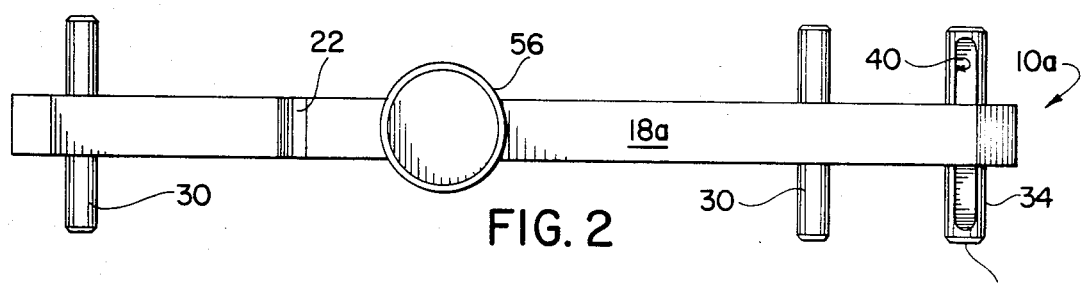
FIG. 2 is a top plan view thereof.
Figure 3:
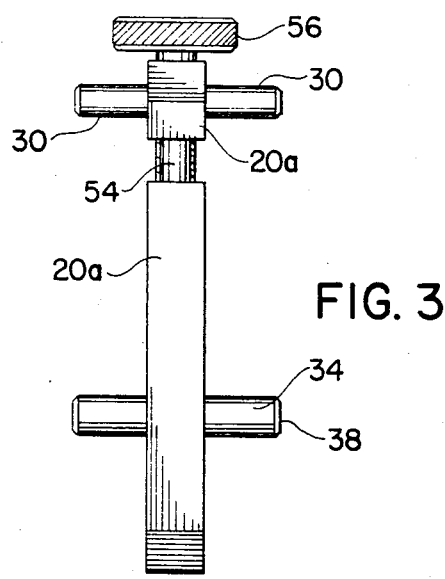
FIG. 3 is a side elevational view.

Turning now in particular to FIGS. 1 through 3 of the drawings, a preferred form of the device 10a is depicted which in essence is of the same of similar construction to that previously described in connection with FIGS. 4 and 7 of the drawings except that a portion of the body thereof in the form of a member 50 is adjustable with respect to the main portion of the body 12a. Such member 50 is preferably of the same thickness as the body 12a and is supported at a variable gap 52 therefrom by means guide pins 54 which inwardly extend at opposite ends thereof into closed bores (not shown) provided in both the main body portion 12a and the member 50. The gap 52 can be set at a minimum distance 50 and then outwardly extended a desired range, i.e., the gap could be set for a minimum ¼ inch and then outwardly extended up to a maximum of say ¾ inch. Of course, this again is dependent on the ultimate dimensioning desired to be brought about by the device. Such adjustment is accomplished by means of an adjusting screw 56 which attaches to the member 50 so as to move therewith and threadably connected to the main body portion 12a by means of its threaded bolt portion 58 in threaded engagement with a threaded bore 60 such that rotation of the knurled handle 62 in opposite directions moves the member 50 vertically upwardly and downwardly with respect to the main body portion 12a so as to modify the gap 52 therebetween and thus adjust the distance of the first outer edge surface 18a disposed thereof with respect to the parallel rows of drill guide openings 24 and 26 respectively. In the modification shown in FIGS. 1 through 3, the first set of guide pegs 30 are positioned on the movable member 50 while the second peg 34 remains in the main body of the device. The construction and functions of peg 34 are also the same as previously described.

In operation, both of the embodiments of the device 10 and 10a operate in a similar fashion. Turning now to FIG. 5 the operation of the more simple embodiment will be described in connection with its use as an aid in determining the position for drilling a hole in a cabinet door so as to affix a door pull thereto. In such regard, the device 10 is positioned such that its longitudinal dimension is vertically disposed so that the pair of first pegs 30 engage the vertical outer edge 58 of the cabinet door 60. In addition, the peg 34 in its normal position, that is, extending both rearwardly and forwardly of the body 12, contacts the upper edge surface 62 of the door and in this way squarely positions the device 10 to the upper corner of the door. In such position the particular guide opening 24 or even 26 is utilized to guide a standard drill through the opening and thus insure that multiple cabinet doors of the same size will when utilizing the device of the present invention position drawer pulls in the exact same position and thus achieve the desired uniformity and in a fast and trouble-free manner. Naturally when utilizing the device 10 to drill the cabinet door facing the cabinet door 60 depicted, then the opposite surface of the body 12 is placed against the planar surface of the cabinet, that is, if the front surface was forwardly positioned as shown in FIG. 5, then the rear surface would be forwardly positioned when doing the mating cabinet door (not shown).

In utilizing the guide 12 as a guide for forming openings for drawer pulls, the second peg 34 is moved to its forward position such that it is flush with the rear surface 16. This is accomplished merely by a slight inward or outward force upon one of the ends 38 thereof as the detent recess engagement can be easily overcome thereby. In such position the upper edge 66 of the drawer face 64 is engaged by the pair of first pegs 30 so that the upper of first guide surface 18 is parallel to the upper surface 66. Thereafter, the opposite edge 21 of the body 12 may be positioned even with the proximal vertical edge 68 of the drawer and then the openings 26 used as a drill guide. Since the second peg 34 is in its forward position it is flush with respect to the rear surface such that the rear surface can smoothly move across the front surface of the drawer and not interfere with the utilization of the drill guide of the present invention in this alternate position.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A drilling fixture for alternate use in drilling holes for the mounting screws for both cabinet drawer and door pulls which drawers and doors have both a flat outer surface and adjacent edge surfaces, comprising a body plate having major planar parallel front and rear surfaces adapted in turn to contact the outer flat cabinet surfaces of said drawers and doors as contrasted with the edge surfaces thereof, said plate further having minor first and second outer edge surfaces disposed in adjacent generally L-shaped configuration to each other, said plate having fixed first guide means outwardly extending in a generally perpendicular attitude from both said front and rear surfaces thereof and disposed proximal to said first outer edge such that engagement of said first guide means with an adjacent edge of said outer cabinet surfaces squares said first edge surface therewith, said plate further having second guide means having opposite front and rear ends normally outwardly extending in a generally perpendicular attitude from both said front and rear body plate surfaces and inwardly offset but proximal to said second outer edge, said second guide means adjustable forwardly and rearwardly such that either end thereof can be disposed in a depressed alternate position essentially flush with regard to the planar plate surface proximal thereto and a plurality of drill guide holes extending through said plate from the front to said rear surfaces thereof, said second guide means being a single cylindrical pin mounted in a cylindrical bore extending through said plate, said plate including detent means to temporarily engage said pin in its alternate positions.

2. The fixture of claim 1, said pin having an open recess extending part way along one side thereof, said detent means adapted for disposition in said recess.

3. A drilling fixture for alternate use in drilling holes for the mounting screws for both cabinet drawer and door pulls which drawers and doors have both a flat outer surface and adjacent edge surfaces, comprising a body plate having major planar parallel front and rear surfaces adapted in turn to contact the outer flat cabinet surfaces of said drawers and doors as contrasted with the edge surfaces thereof, said plate further having minor first and second outer edge surfaces disposed in adjacent generally L-shaped configuration to each other, said plate having fixed first guide means outwardly extending in a generally perpendicular attitude from both said front and rear surfaces thereof and disposed proximal to said first outer edge such that engagement of said first guide means with an adjacent edge of said outer cabinet surfaces squares said first edge surface therewith, said plate further having second guide means having opposite front and rear ends normally outwardly extending in a generally perpendicular attitude from both said front and rear body plate surfaces and inwardly offset but proximal to said second outer edge, said second guide means adjustable forwardly and rearwardly such that either end thereof can be disposed in a depressed alternate position essentially flush with regard to the planar plate surface proximal thereto and a plurality of drill guide holes extending through said plate from the front to said rear surfaces thereof, said first and second outer edge surfaces of said plate being of regular straight configuration, said first guide means being a pair of longitudinally spaced pegs inwardly offset from and parallel to said first outer edge, said second guide means being a single cylindrical pin mounted in a cylindrical bore, said second guide means being a single cylindrical pin mounted in a cylindrical bore extending through said plate, said plate including detent means to temporarily engage said pin in its alternate positions.

4. A drilling fixture for alternate use in drilling holes for the mounting screws for both cabinet drawer and door pulls which drawers and doors have both a flat outer surface and adjacent edge surfaces, comprising a body plate having major planar parallel front and rear surfaces adapted in turn to contact the outer flat cabinet surfaces of said drawers and doors as contrasted with the edge surfaces thereof, said plate further having minor first and second outer edge surfaces disposed in adjacent generally L-shaped configuration to each other, said plate having fixed first guide means outwardly extending in a generally perpendicular attitude from both said front and rear surfaces thereof and disposed proximal to said first outer edge such that engagement of said first guide means with an adjacent edge of said outer cabinet surfaces squares said first edge surface therewith, said plate further having second guide means having opposite front and rear ends normally outwardly extending in a generally perpendicular attitude from both said front and rear body plate surfaces and inwardly offset but proximal to said second outer edge, said second guide means adjustable forwardly and rearwardly such that either end thereof can be disposed in a depressed alternate position essentially flush with regard to the planar plate surface proximal thereto and a plurality of drill guide holes extending through said plate from the front to said rear surfaces thereof, said plate including a vertically adjustable member forming a part thereof, said first outer edge and said first guide means disposed on said member, said second guide means being a single cylindrical pin mounted in a cylindrical bore extending through said plate, said plate including detent means to temporarily engage said pin in its alternate positions.

* * * * *